United States Patent [19]

Forbes

[11] 4,014,583
[45] Mar. 29, 1977

[54] AUTOMOBILE BUMP PROTECTOR

[76] Inventor: Arthur A. Forbes, 14030 Chadron, Apartment 116, Hawthorne, Calif. 90250

[22] Filed: Mar. 1, 1976

[21] Appl. No.: 662,526

[52] U.S. Cl. .............................. 293/62; 293/DIG. 6
[51] Int. Cl.$^2$ .................... B60J 11/00; B60R 19/00
[58] Field of Search ........................ 296/146, 152; 293/DIG. 6, DIG. 4, 62, 1; 52/716

[56] References Cited

UNITED STATES PATENTS

| | | | |
|---|---|---|---|
| 3,132,780 | 5/1964 | Binding | 293/DIG. 4 |
| 3,147,176 | 9/1964 | Haslam | 293/DIG. 6 |
| 3,309,129 | 3/1967 | Newman | 293/62 |
| 3,472,546 | 10/1969 | Samuels | 293/DIG. 4 |
| 3,582,134 | 6/1971 | Shaff | 293/62 |
| 3,610,669 | 10/1971 | Morrissey | 293/62 |
| 3,704,037 | 11/1972 | Glassberg | 293/62 |
| 3,738,695 | 6/1973 | McBee | 296/146 |

FOREIGN PATENTS OR APPLICATIONS

| | | | |
|---|---|---|---|
| 1,077,058 | 4/1954 | France | 293/62 |

*Primary Examiner*—Richard J. Johnson
*Attorney, Agent, or Firm*—Thomas H. Jones

[57] ABSTRACT

An automobile bump protector having a plurality of force-absorbing body portions with the body portions being flexibly joined together and being foldable relative to each other to form a compact package. The body portions in their unfolded state provide a side area having a length that covers the "bump area" of an automobile side panel and a width which is sufficient to shield the outward extremities of an automobile side panel from impact.

The bump protector includes a plurality of hanger straps such that the body portions may be suspended in an unfolded state adjacent to an automobile side panel to shield the side panel from physical contact. Magnetic members are associated with each of the body portions and the magnetic members of adjacent body portions are positioned to provide mutual attraction between adjacent body portions when the body portions are folded together to form a compact package.

16 Claims, 15 Drawing Figures

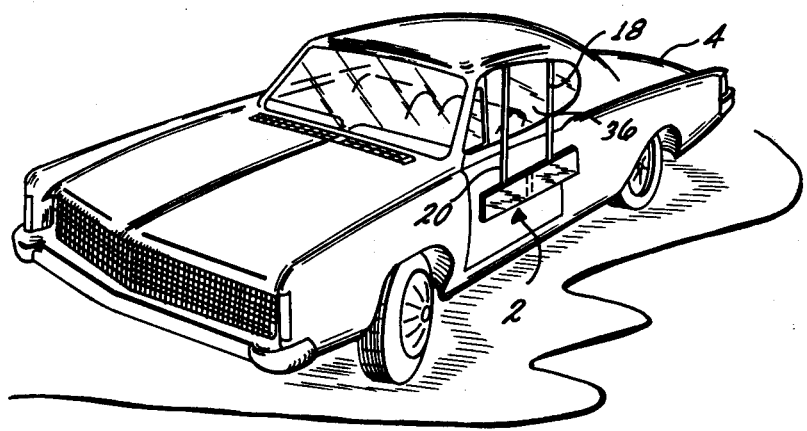
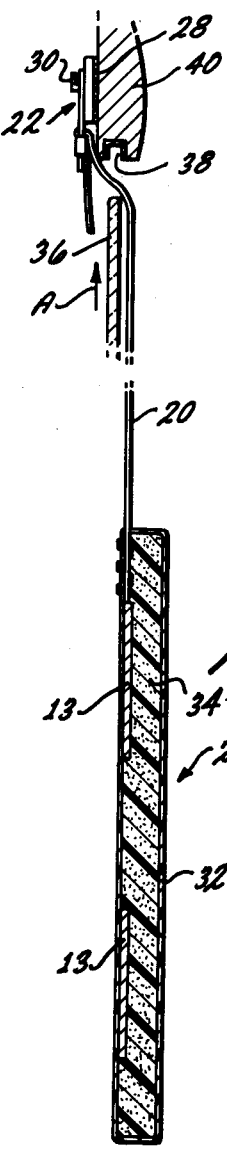
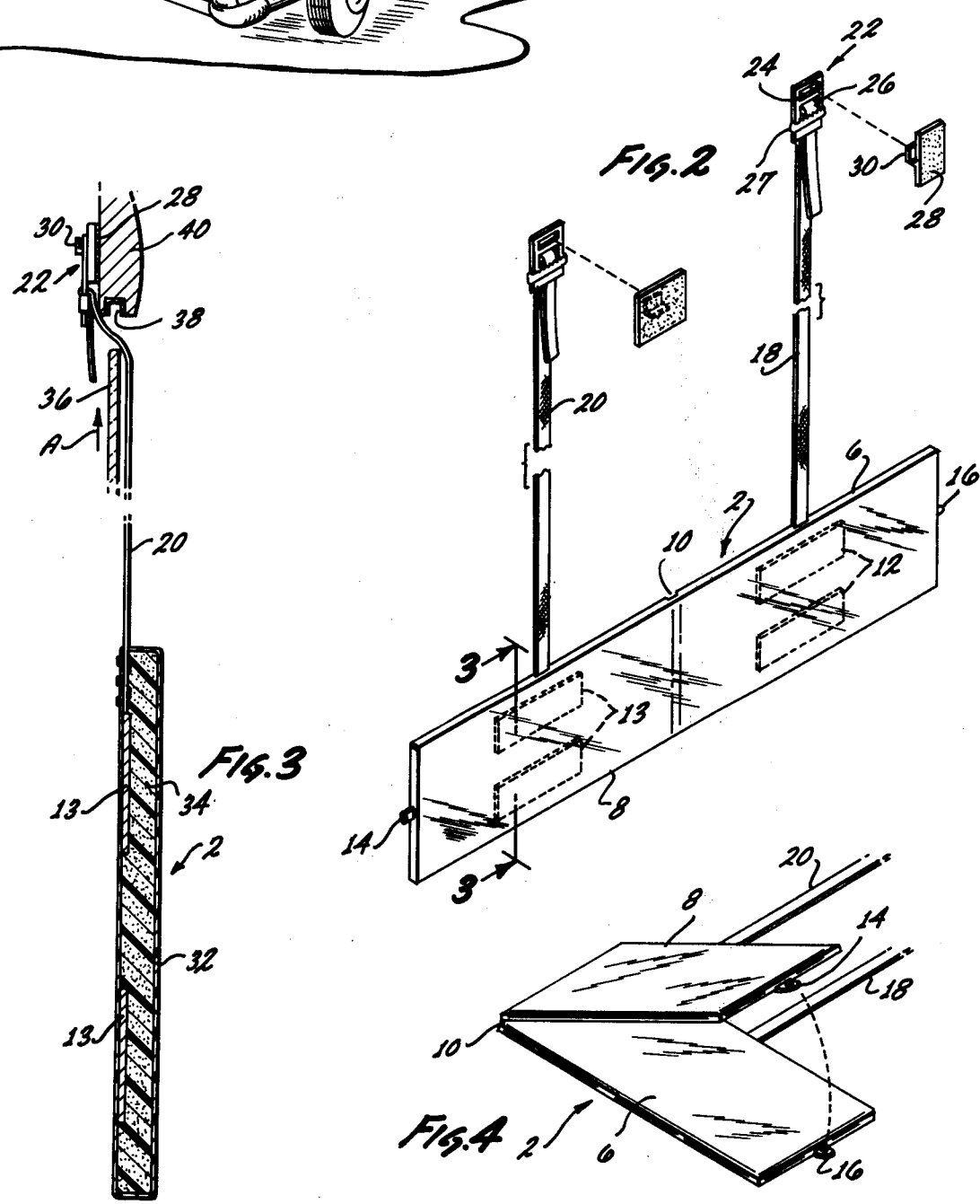
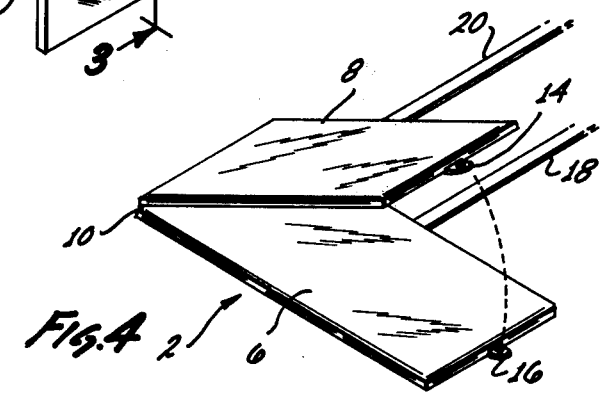

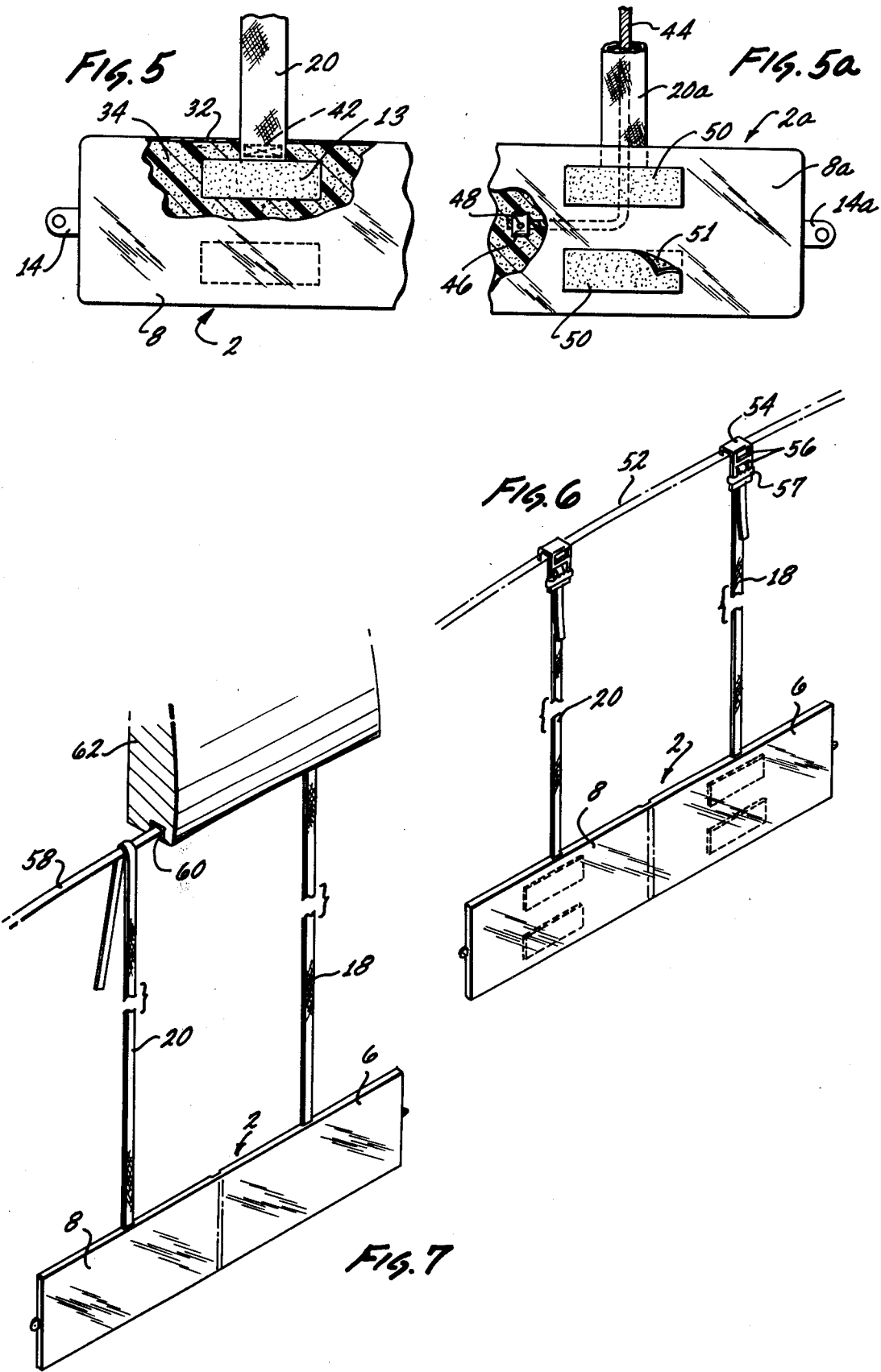

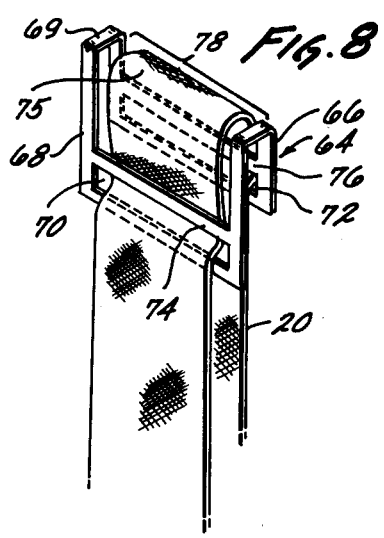
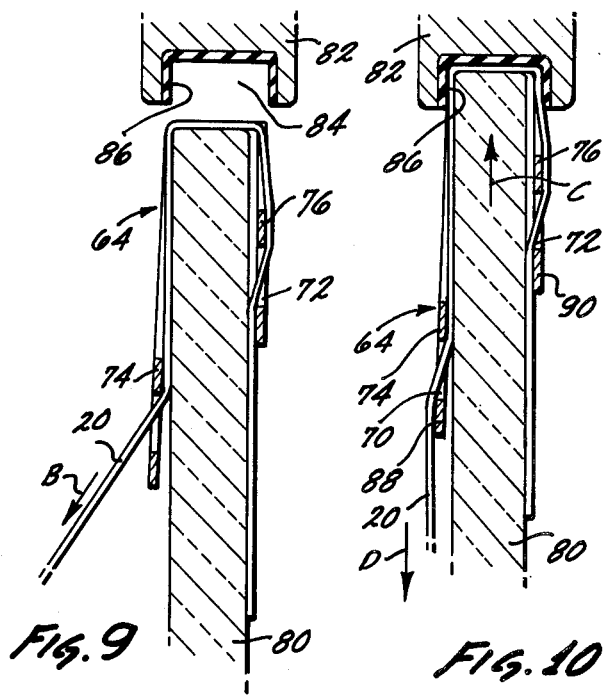
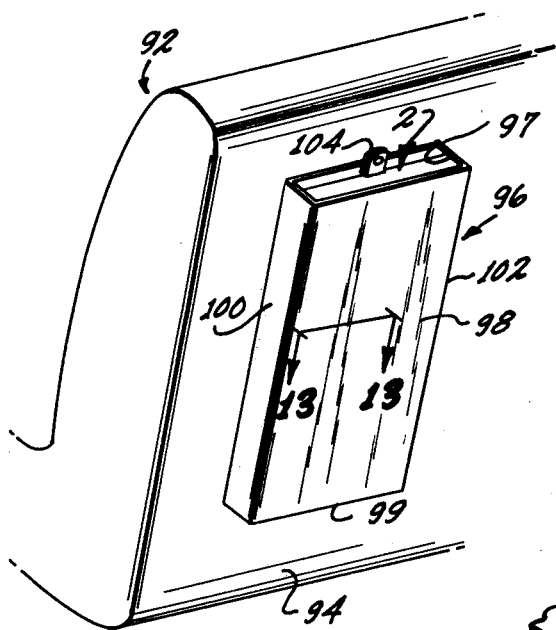
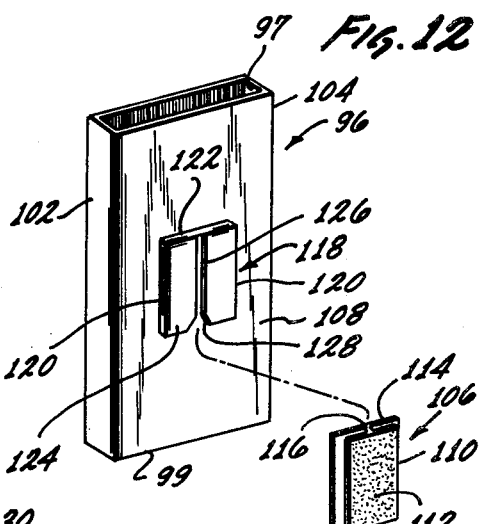
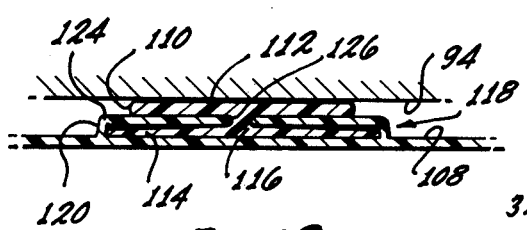
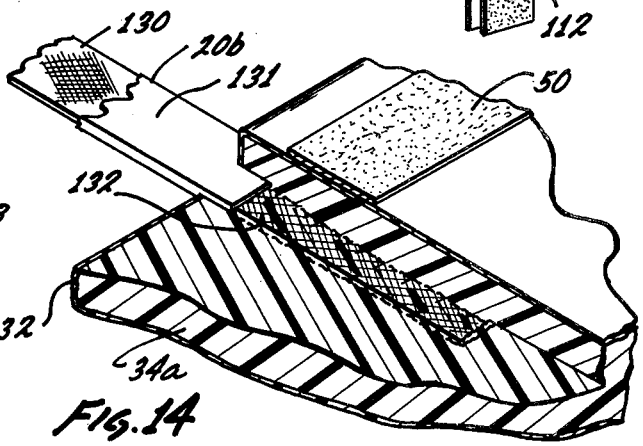

AUTOMOBILE BUMP PROTECTOR

BACKGROUND OF THE INVENTION

With inflation, the cost of automobiles and automotive repairs has markedly increased. Also, in the design of automobiles, particularly sports cars, the automobile side panels may frequently be devoid of any protective mounting, such as a chrome strip, which would protect the side panels against impact. While the absence of a protective strip on the side panel of an expensive automobile may greatly improve its appearance, the automobile is, then, much more susceptible to damage when parked in close proximity to other automobiles in a lot.

A relatively common form of damage to a parked automobile is a dented side panel resulting from the opening of the door of an adjacent automobile. When automobiles are parked close together, it is frequently very difficult, if not impossible, to enter an automobile without opening the automobile door sufficiently wide to bring it into contact with the side panel of an adjacent automobile. If the person entering an automobile is careless or impatient, the automobile door may well be opened with sufficient force to put a dent in the side panel of the adjacent vehicle. Due to the high cost of automotive repairs, dents of this nature may be so expensive to remove that the car owner will simply resign himself to having his expensive car dented by discourteous or careless people who bang their doors into the side panels of the immediately adjacent vehicles.

At present, resilient moldings are available which can be affixed to the side panels of an automobile to offer it some form of protection against being bumped by the doors of closely adjacent vehicles. However, such moldings do not offer much protection because the moldings are too narrow and do not adequately cover the "bump area" which is a strip 6 to 10 inches wide extending along an automobile side panel for a distance of about three feet or more at approximately the height of the automobile door handle. Further, the addition of a permanent protective mounting to an automobile side panel may destroy the beauty of the automobile by breaking up the smooth and simple lines of its exterior surface.

In view of the above difficulties, it would be desirable to have a bump protector which could be temporarily mounted on the side panels of a parked automobile to protect the vehicle from bumps resulting from the opening of the doors to immediately adjacent vehicles. Although temporary, such a temporary bump protector would be securely mounted on the side panel of a parked automobile such that it could not be dislodged by wind forces and could not be easily stolen. Further, such a temporary bump protector would desirably be foldable into a compact package when not in use so that the bump protector could be conveniently carried and stored.

SUMMARY OF THE INVENTION

In solving the aforementioned problems, I have provided a bump protector in which a plurality of force-absorbing body portions are flexibly joined together with the body portions being foldable relative to each other to form a compact package. In their unfolded state, the body portions provide a side area having a length that is in the order of about 3 feet and a width which is sufficient to shield the outer extremities of an automobile side panel from impact. The bump protector also includes a plurality of hanger straps which are connected to the body portions. Through use of the hanger straps, the body portions may be suspended in an unfolded state adjacent an automobile side panel to shield the outer extremities of the side panel from physical contact.

In fixing the position of the bump protector relative to an automobile side panel, magnetic members are associated with each of the body portions. These magnetic members are attracted to a metallic side panel to hold the bump protector securely in place during usage. Additionally, however, the magnetic members of adjacent body portions are positioned to provide a mutual attraction between the adjacent body portions when the body portions are folded together to form a compact package.

Preferably, the bump protector is formed of two body portions and has two hanger straps with each body portion being of an equal size and the body portions being connected together along a flexible fold line. One hanger strap is then connected to each of the body portions for suspending the body portions in an open or unfolded state adjacent a metallic automobile side panel.

Each of the body portions of the bump protector may include an interior filling material which is resilient, tough and firm in a compressed state, and which was high energy absorption during compression. Additionally, each body portion may include an outer cover which is water resistant and is easily cleaned.

In suspending the bump protector adjacent an automobile side panel, the bump protector may include hanger members for securing the hanger straps to the automobile. Additionally, to make theft of the bump protector more difficult, a cable may be positioned within one or more of the hanger straps with the cable having an inner end which is fixedly anchored within a body portion and an outer end which is substantially coextensive with the outer end of the hanger strap which contains the cable.

The magnetic members which are included in the bump protector may be of several types. The magnetic members may, for example, be bar magnets which are mounted within the interior of each of the body portions at locations which are adjacent to the surfaces of the body portions that are in contact with an automobile side panel during use of the bump protector. The bar magnets in adjacent body portions may then be positioned in aligned relation when the adjacent body portions are in a folded condition. Additionally, the bar magents in adjacent body portions may be positioned with opposite poles of the magnets in contiguous relation when the adjacent body portions are in a folded condition. In this manner, the bar magnets in adjacent body portions provide mutual attraction between the adjacent body portions when in a folded condition.

The magnetic members included in the bump protector may also be formed from pieces of magnetic tape. The pieces of magnetic tape may then be mounted on the surfaces of the body portions which are in contact with an automobile side panel during use of the bump protector. Additionally, the pieces of magnetic tape on adjacent body portions of the bump protector may be positioned in aligned relation when the adjacent body portions are in their folded condition. Also, the pieces of magnetic tape on adjacent body portions may be positioned to provide a mutual attraction between adjacent body portions when the adjacent body portions are in a folded condition.

Further, the bump protector may also include a hanging clip for securing the hanger straps of the bump protector to an automobile window or windows and for positioning the bump protector at a desired height relative to an automobile side panel. Also, in carrying the bump protector when it is folded into a compact package, the present invention provides a carrying case that may be mounted in a convenient location within an automobile - such as on a rear surface of one of the front seats.

BRIEF DESCRIPTION OF THE DRAWINGS

To more fully illustrate a preferred embodiment of the invention, reference is made to the accompanying drawings in which:

FIG. 1 is a pictorial view of an automobile having a bump protector temporarily secured to a side panel of the automobile;

FIG. 2 is a more detailed pictorial view of the bump protector of FIG. 1 illustrating the component parts of the bump protector and the manner in which the bump protector may be secured to the side panel of an automobile;

FIG. 3 is a sectional view of the bump protector of FIG. 2 taken along the line indicated by the arrows 3—3;

FIG. 4 is a pictorial view of the bump protector of FIG. 2 illustrating the manner in which adjacent body portions of the bump protector may be folded relative to each other to provide a small compact package;

FIG. 5 is a partial rear view of a bump protector with portions being shown in section to illustrate the manner in which a hanger strap may be secured to one of the body portions of the bump protector;

FIG. 5a is a partial front view of a bump protector showing the use of a cable positioned within a hanger strap while magnetic members for the bump protector may be pieces of magnetic tape;

FIG. 6 is a pictorial view, similar to FIG. 2, illustrating the use of hangers which may engage the top edge of an automobile window in securing the bump protector to an automobile;

FIG. 7 is a pictorial view, similar to FIG. 6, illustrating a bump protector secured to an automobile simply by clamping the hanger straps between the upper edge of an automobile window and the groove which engages the upper edge of the window with the window in a closed condition;

FIG. 8 is a pictorial view of a hanger clip for securing the bump protector at a desired height with respect to an automobile side panel with the hanger clip engaging an automobile window and a hanger strap slidably engaging the hanger clip;

FIG. 9 is a sectional view illustrating the manner in which the hanger strap may undergo relative movement with respect to the hanger clip while positioning the bump protector at a desired height relative to an automobile side panel;

FIG. 10 is a sectional view, similar to FIG. 9, illustrating upward movement of the automobile window and hanger clip to engage the hanger clip with the window groove and to clamp the hanger strap between the window and window groove;

FIG. 11 is a pictorial view illustrating a carrying case for the bump protector with the carrying case being mounted on the back of one of the automobile front seats;

FIG. 12 is an exploded pictorial view of the carrying case of FIG. 11 which illustrates a support that may be affixed to a surface within an automobile with the support then engaging a slot formed on the carrying case to position the carrying case in a desired location;

FIG. 13 is a sectional view of the support of FIG. 12 showing engagement of the support with the slot formed on the carrying case, and FIG. 14 is a fragmentary sectional view of a further embodiment of a bump protector in which a wire-mesh strip is positioned within a hanger strap with the inner end of the wire-mesh member being anchored within the body of the bump protector.

Detailed Description

FIG. 1 illustrates a bump protector 2 of the invention which is positioned adjacent a metallic side panel of an automobile 4. As positioned, the bump protector 2 shields the "bump area" which is the area commonly subjected to impact during opening of the door of an adjacent vehicle. The "bump area" generally has a length in the order of about 3 feet or more and a width of about 6 to 10 inches adjacent the door region of the automobile and at a height with respect to the ground surface which is approximately the height of the door handles or slightly lower.

Turning to FIG. 2, which is an enlarged pictorial view of the bump protector 2 of FIG. 1, the bump protector may be formed of a plurality of body portions such as body portions 6 and 8 which are flexibly connected to each other along a fold line 10. In securing the bump protector 2 to a metallic side panel of an automobile, the body portion 6 may include bar magnets 12 while the body portion 8 includes bar magnets 13.

The bar magnets 12 and 13 may be positioned in such a manner that when the body portions 6 and 8 are folded together, the bar magnets 12 and 13 are positioned in contiguous relation. Additionally, to provide a mutual attractive force between body portions 6 and 8 when in a folded condition, the bar magnets 12 and 13 may be positioned in such a manner that poles of unlike polarity are positioned in contiguous relation with the body portions in their folded condition. Thus, for example, the north poles of bar magnets 12 may be aligned with the south poles of bar magnets 13 while the south poles of bar magnets 12 are aligned with the north poles of bar magnets 13 when the body portions 6 and 8 are in their folded condition. In this manner, the bar magnets 12 and 13 serve a dual purpose, first in holding the bump protector 2 in a firm position against a metallic automobile side panel and second, in providing a mutual attractive force between adjacent body portions when the body portions are in their folded condition. With the body portions 6 and 8 in a folded condition, the body portions may be retained in folded condition through the use of a fastener of any type, such as the fastener indicated by the eye 14 and hook 16 of FIG. 2. The hook 16 may engage the eye 14 to maintain the body portions in a folded condition in providing a small compact package which is convenient for storage of the bump protector 2 when not in use.

In securing the bump protector 2 in a given position relative to an automobile, the bump protector may be suspended from the automobile by means of hanger straps 18 and 20 which are connected to the respective body portions 6 and 8. Each of the straps 16 and 18 may have their upper ends in engagement with a buckle 22 having therein an upper slot 24 and a lower slot 26. The straps 18 and 20 may be adjustably positioned within the lower slots 26 of buckles 22 with the positions of the straps relative to the buckles being fixed by a strap retainer 27 that is slidable relative to the buckle in a conventional manner to engage and, thereby, fix the position of the strap within the lower slot. After adjusting the positions of straps 18 and 20 with respect to buckles 22, the buckles may then be engaged with brackets 28 which are fixedly secured within the interior of an automobile. The brackets 28 each include a hook 30 which engages the upper slot 24 of the buckle 22. When, thus, engaged, the buckles 22 are fixedly secured to brackets 28 such that the bump protector 2 cannot be removed from the automobile.

FIG. 3, which is a sectional view taken along line 3—3 of FIG. 2, illustrates the manner in which the bump protector 2 may be secured to an automobile. As illustrated, the bump protector 2 may include an exterior cover 32 that may be formed, for example, of a material such as vinyl which is water resistant and is also easily cleaned. The interior of the bump protector 2 may include a resilient filler material 34 such as, for example, neoprene which is resilient but is also quite tough and firm in a compressed state. Additionally, the filler material 34 may have high energy absorption during compression such that the energy of a sharp impact is absorbed by the filler material and is not transmitted to the metallic automobile side panel.

In securing the bump protector 2 in position adjacent the metallic side panel of an automobile, the hanger straps 18 and 20, such as strap 20 in FIG. 3, may be inserted into the automobile interior through an open window with the buckles 22 in engagement with the brackets 28. Thereafter, the automobile window, such as window 36, may be moved in an upward direction as indicated by the arrow A until the upper edge of the window is retained within a window groove 38 formed in the frame member 40. The hanger straps, such as strap 20, are then grasped tightly so that it is impossible to remove the bump protector 2 without breaking the automobile window to gain access to the vehicle interior.

In suspending a bump protector 2 adjacent an automobile side panel, the bump protector may span a distance which includes portions of several doors in the case of a four-door vehicle. Thus, one of the hanger straps, such as strap 20, may be inserted through the window of the front door, as described, while the hanger strap 18 is inserted through the window of the rear door. Also, in this situation, the brackets 28 may be positioned within the automobile interior so that one of the brackets is above the front door while another bracket is above the rear door.

Also, depending upon the size of the vehicle and the number of doors, the bump protector may be somewhat longer in its physical dimensions for use with a four-door vehicle and somewhat shorter for use with a two-door vehicle. Additionally, of course, the bump protector may be made up of more than two body portions. Thus, for example, the bump protector may be formed of three foldable body portions with three hanger straps being used for suspending the bump protector relative to an automobile. Also, in the case of a bump protector having more than two body portions, the hanger straps need only be connected to the end body portions. For example, in a bump protector composed of three body portions, the two endmost body portions may be connected to an automobile through hanger straps while the middle body portion is merely joined physically to the two endmost body portions.

FIG. 4 is a pictorial view illustrating the folding of the body portions 6 and 8 relative to each other along the fold line 10 when the bump protector 2 is not in use. During folding of the body portions 6 and 8, as illustrated, the hanger straps 18 and 20 may conveniently be placed between the body portions. The hanger straps 18 and 20 are, then, out of the way so that the folded bump protector 2 forms a compact package which is convenient for shipping and storage.

FIG. 5 is a partial outer view of the surface body portion 8 of the bump protector 2 as positioned against a side panel which indicates the manner in which a hanger strap 20 may be secured to the body portion. As illustrated, the hanger strap 20 may be secured within the body of the bump protector by stitching 42 that secures the hanger strap to the outer cover 32. Additionally, as illustrated, the bar magnets 13 may be positioned within the interior of the body portion 8 with the bar magnets being positioned adjacent the surface of the body portion which is in contact with a metallic automobile side panel during usage of the bump protector 2.

FIG. 5a is a partial view of the inner surface of a modified bump protector 2a which is positioned against an automobile side panel in which a cable 44 is positioned within a hanger strap 20a with the end of the cable being anchored within the interior of a body portion 8a. In anchoring the cable 44 within the interior of body portion 8a, a ring enlargement 46 may be positioned about the inner end of the cable with a lock pin 48 projecting through a hole in the ring enlargement into the cable.

Additionally, as shown in FIG. 5a, the magnetic members secured to the body portion 8a may be in the form of pieces of magnetic tape 50. In using pieces of magnetic tape 50, an adhesive surface 51 on the tape may merely be pressed against the inner surface of the body portion 8a with the pieces of magnetic tape being positioned in the same general manner as described in FIG. 2 where the magnetic members were composed of bar magnets. That is to say, the pieces of magnetic tape 50 on adjacet body portions are positioned in aligned relation to exert a mutual attractive force between the adjacent body portions when in a folded condition. By utilizing a cable 44 within one or more of the hanger straps, such as hanger strap 28, added protection against theft is provided since it would then be more difficult for a thief to remove the bump protector 2a from the automobile by cutting the hanger straps.

FIG. 6 is a pictorial view of a further embodiment of the bump protector 2 in which hanger straps 18 and 20 are secured to an automobile window 52 in its raised position through the use of window hooks 54. As indicated, the window hooks 54 may contain one or more slots 56 together with a strap retainer 57 which is slidable relative to the window hook in adjustably securing the hanger strap to the window hook.

As illustrated in FIG. 7, the bump protector 2 may be secured to an automobile merely by clamping of the hanger straps 18 and 20 between a raised automobile window 58 and a window slot 60 formed in a frame member 62. While this means of securing the bump protector 2 to an automobile has the advantage of eliminating the need for buckles 22 and brackets 28

(FIGS. 2 and 3) or window hooks 54 (FIG. 6), the height of the bump protector may then be somewhat more difficult to adjust since it will require individually positioning the hanger straps in clamped engagement with the window 58 and window slot 60.

In another embodiment of the invention illustrated in pictorial view in FIG. 8, a specially constructed hanger clip, generally indicated as 64, may be used in adjustably securing the bump protector at a desired height relative to an automobile side panel. As used herein, the term "side panel" refers to the automobile doors or to other side areas of an automobile which are not doors. The hanger clip 64 includes an inner leg 66 which may be positioned on the inside of an automobile window and an outer leg 68 in contact with the exterior surface of an automobile window. The inner leg 66 and outer leg 68 are connected by a connecting web 69 with a slot 70 being formed in the outer leg and a slot 72 being formed in the inner leg. In joining a hanger strap 20 to hanger clip 64, the hanger strap is threaded through slot 70 with the strap passing beneath a cross member 74 and the direction of the strap then being reversed to form a loop 75. After forming the loop 75, the strap 20 passes over a cross member 76 and then through slot 72 with the free end of the strap being positioned on the inside of the automobile window.

The hanger clip 64 includes an open section 78 which serves several functions in the performance of the hanger clip. By providing open section 78, the loop 75 formed by strap 20 is unimpeded by the hanger clip 64. Thus, when the automobile window is closed, the loop 75 may be firmly gripped by the window. Further, the open section 78 reduces the volume of material in the hanger clip 64 and, thereby, increases the springiness or resiliency of the clip such that the clip does not interfere with closing of the automobile window.

FIG. 9 is a sectional view of an automobile window 80 with the hanger clip 64 attached thereto and illustrates the manner in which the hanger clip may be used in positioning the bump protector at a desired height with respect to an automobile side panel. As shown, the automobile window 80 may be in a raised position with the window being relatively closely positioned to a frame member 82. The frame member 82 has a window groove 84 formed therein with a groove liner 86 which may be a relatively soft material positioned within the window groove. With the window 80 in a raised position, the hanger clip 64 may then be positioned over the upper edge of the window. Prior to placing the hanger clip 64 over window 80, the strap 20 may be connected to the hanger clip in the manner described in FIG. 8. Conversely, the hanger clip 64 may first be positioned on the window 80 and the strap 20 may then be passed through the slots 70 and 72 in connecting the hanger strap to the hanger clip.

With the hanger clip 64 positioned on window 80 as illustrated in FIG. 9, the bump protector then may be pulled downwardly with respect to the hanger clip to position the bump protector at a desired height relative to an automobile side panel. During downward movement of the bump protector with respect to hanger clip 64, the strap 20 may undergo relative movement with respect to the hanger clip with the movement of the hanger strap being illustrated by the arrow B.

After positioning the bump protector at a desired height relative to an automobile side panel, the position of the bump protector may be relatively fixed due to the attraction of the magnetic members of the bump protector, as described previously, with respect to the metallic automobile side panel. At this point, the window 80 may then be moved to a completely closed position as illustrated in FIG. 10 which is a sectional view similar to FIG. 9. During closing of the window 80, the window may be moved in the direction of the arrow C to slightly compress the hanger clip 64 on movement of the hanger clip into window groove 84. During movement of the window 80 in the direction of arrow C, the position of the hanger strap 20 may change with respect to hanger clip 64 due to the relatively fixed position of the bump protector with respect to the automobile side panel. Accordingly, as window 80 is raised in the direction of arrow C, the hanger strap 20 may move in the direction of arrow D. During movement of the hanger strap 20 in the direction of arrow D, the hanger strap engages a cross member 88 and a cross member 90 which, together with cross members 74 and 76, form the slots 70 and 72.

As discussed previously, the present bump protector has the advantage of being foldable when not in use to form a small compact configuration. Accordingly, the bump protector may be readily shipped and stored when not in use. FIG. 11 illustrates the bump protector 2 being conveniently carried in its folded state within an automobile behind a front seat 92. The front seat 92 includes a rear surface 94 with a carrying case 96 supported thereon. The carrying case 96 is in the form of a closed container except for a top opening 97 which receives the folded bump protector 2. The carrying case 96, thus, includes an outer wall 98, a bottom wall 99, a sidewall 100, and a sidewall 102. For ease in removal of the bump protector 2 from carrying case 96, the bump protector may include a pull tab 104 which extends upwardly from the top opening 97. The function of the pull tab 104 may conveniently be supplied by the fastener for the bump protector 2 which, as illustrated in FIGS. 2 and 4, includes an eye 14 and hook 16.

FIG. 12, which is a pictorial view of the carrying case 96 as viewed from the direction of front seat 92, illustrates an I-shaped support 106 which provides support to the inner wall 108 of the carrying case. The I-shaped support 106 includes an inner flange 110 having a gummy surface 112 thereon and an outer flange 114 which is connected to the inner flange through a web 116. The outer flange 114 supports the carrying case 96 by engaging a support slot 118 which may be formed integrally with the inner wall 108 of the carrying case. The support slot 118, as illustrated, may include a pair of sidewalls 120, a top wall 122, and a pair of outer walls 124 which are separated by a slide opening 126. The support slot 118 has a bottom opening which is positioned opposite to the top wall 122 with the slide opening 126 terminating at a pair of diverging guide surfaces 128 which terminate at the bottom opening.

The engagement of outer flange 114 of support 106 with the support slot 118 is illustrated in FIG. 13 which is a sectional view taken along the line 13—13 of FIG. 11. As shown, the gummy surface 112 of support 106 may be adhered to the back surface 94 of seat 92 so that the support is fixedly positioned with respect to the seat. The outer flange 114 may then be positioned within support slot 118 by guiding the bottom opening of the support slot over the outer flange. As the support slot 118 is, thereby, positioned over the outer flange 114, the web 116 of the support 106 passes through slide opening 126. With support slot 118 fully engaged with the outer flange 114, the upper surface of the outer flange may contact the inner surface of the top wall 122 (see FIG. 12) with the top wall, thereby, acting as a stop member in limiting the movement of the support slot with respect to the outer flange. As, thus, supported, the carrying case 96 may be easily removed from support 106 by merely lifting the carrying case upwardly to remove the outer flange 114 from support slot 118.

FIG. 14 is a sectional view of a further embodiment of the bump protector with parts broken away to illustrate the securing of a hanger strap 20b within the body of the bump protector. For ease in understanding, the reference numerals used in FIG. 14 are similar to those used in FIG. 5a. As a safety measure to prevent theft of the bump protector, a fine wire-mesh strip 130 may be positioned within the hanger strap 20b with the hanger strap including an outer cover 131 which may be formed of a washable vinyl material similar to the cover 32 for the bump protector. As illustrated, the outer cover 131 extends only slightly into the body of the bump protector to leave an exposed length of the wire-mesh strip 130 which extends further into the body of the bump protector. The filler material for the bump protector referred to by numeral 34a may be a commercially available foamed plastic material which may be formed in situ in a well known manner within a forming mold. With the exposed length of the wire-mesh strip 130 extending into the forming mold, the filler material 34a forms a secure bond 132 with the wire-mesh strip by passage of the filler material through the openings in the wire-mesh strip. After forming the filler material 34a within a mold to form a bond 132 with the wire-mesh strip 130, the filler material may be removed from the mold and encased within the outer cover 32, etc., as described previously in regard to FIG. 5a.

I claim:

1. An automobile bump protector comprising:
a plurality of force-absorbing body portions;
said body portions being flexibly joined together with the portions being foldable relative to each other to form a compact package;
said body portions in their unfolded state providing a side area which has a length and a width which is sufficient to shield the bump area of an automobile side panel;
a plurality of hanger straps connected to said body portions such that said portions may be hung in an unfolded state adjacent an automobile side panel to shield the bump area of the side panel from physical contact;
magnetic members associated with each of said body portions, and
the magnetic members of adjacent body portions positioned to provide mutual attraction between adjacent body portions when the body portions are folded together to form a compact package,
whereby the body portions in an unfolded state while hung from an automobile by the hanger straps are attracted to a metallic automobile side panel by the magnetic members with a sufficient force to prevent shifting or dislodgment of the bump protector from the automobile by wind forces.

2. The bump protector of claim 1 wherein
said bump protector is formed of two body portions and two hanger straps;
each of said body portions being of an equal size;
said body portions being connected together at a flexible fold line, and
one hanger strap being connected to each of said body portions.

3. The bump protector of claim 1 wherein
each of said body portions includes an interior filling material which is resilient, tough and firm in a compressed state, and which was high energy absorption during compression, and
each of said body portions has an outer cover which is water resistant and is easily cleaned.

4. The bump protector of claim 2 wherein
each of said body portions includes an interior filling material which is resilient, tough and firm in a compressed state, and which has high energy absorption during compression, and
each of said body portions has an outer cover which is water resistant and is easily cleaned.

5. The bump protector of claim 1 including hanger members for securing said hanger straps to an automobile.

6. The bump protector of claim 2 including
hanger members for securing said hanger straps to an automobile.

7. The bump protector of claim 1 including
a cable positioned within one or more of said hanger straps, and
said cable having an inner end which is fixedly anchored within a body portion.

8. The bump protector of claim 2 including
a cable positioned within one or more of said hanger straps, and
said cable having an inner end which is fixedly anchored within a body portion.

9. The bump protector of claim 1 including
a wire-mesh strip positioned within one or more of said hanger straps, and
said wire-mesh strip having an inner end which is fixedly anchored within a body portion.

10. The bump protector of claim 2 including
a wire-mesh strip positioned within one or more of said hanger straps, and
said wire mesh strip having an inner end which is fixedly anchored within a body portion.

11. The bump protector of claim 1 wherein
said magnetic members are bar magnets;
said magnets being mounted within the interior of each of the body portions at locations which are adjacent to the surfaces of the body portions that are in contact with an automobile side panel during use of the bump protector;
the magnets in adjacent body portions being positioned in aligned relation when the adjacent body portions are in folded relation, and
the magnets in adjacent body portions being positioned with opposite poles in contiguous relation when the adjacent body portions are in folded relation.

12. The bump protector of claim 2 wherein
said magnetic members are bar magnets;
said magnets being mounted within the interior of each of the body portions at locations which are adjacent to the surfaces of the body portions that are in contact with an automobile side panel during use of the bump protector;
the magnets in adjacent body portions being positioned in aligned relation when the adjacent body portions are in folded relation, and the magnets in adjacent body portions being positioned with opposite poles in contiguous relation when the adjacent body portions are in folded relation.

13. The bump protector of claim 1 wherein said magnetic members are pieces of magnetic tape;

said pieces of tape being mounted on the surfaces of the body portions that are in contact with an automobile side panel during use of the bump protector;

the pieces of magnetic tape on adjacent body portions being positioned in aligned relation when the adjacent body portions are in folded relation, and the pieces of magnetic tape on adjacent body portions being positioned to provide mutual attraction between adjacent body portions when the adjacent body portions are in folded relation.

14. The bump protector of claim 2 wherein
said magnetic members are pieces of magnetic tape;

said pieces of tape being mounted on the surfaces of the body portions that are in contact with an automobile side panel during use of the bump protector;

the pieces of magnetic tape on adjacent body portions being positioned in aligned relation when the adjacent body portions are in folded relation, and the pieces of magnetic tape on adjacent body portions being positioned to provide mutual attraction between adjacent body portions when the adjacent body portions are in folded relation.

15. The bump protector of claim 1 including fastener means to secure said body portions together in folded relation.

16. The bump protector of claim 2 including fastener means to secure said body portions together in folded relation.

* * * * *